Sept. 14, 1937.  R. TONDEUR  2,092,898

FLEXIBLE TUBING

Filed Oct. 25, 1933  2 Sheets-Sheet 1

INVENTOR
Rene Tondeur
BY
Nathan, Bowman & Helfrich
ATTORNEYS

Sept. 14, 1937.    R. TONDEUR    2,092,898
FLEXIBLE TUBING
Filed Oct. 25, 1933    2 Sheets-Sheet 2
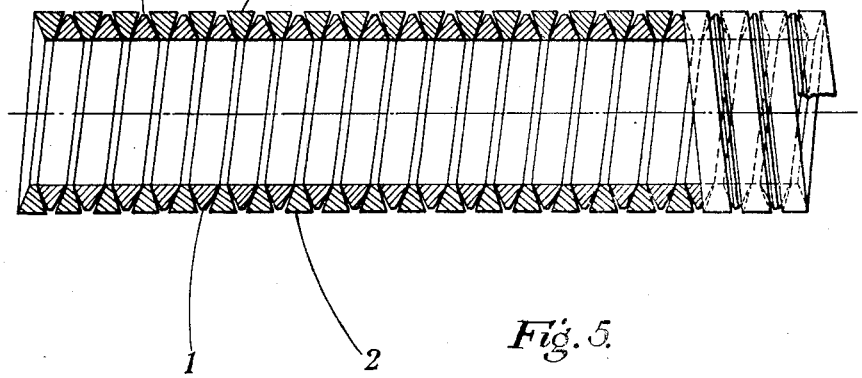
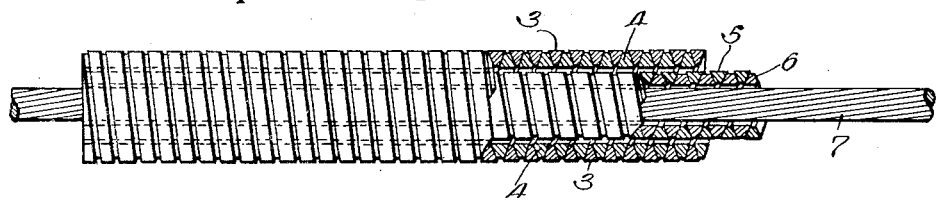
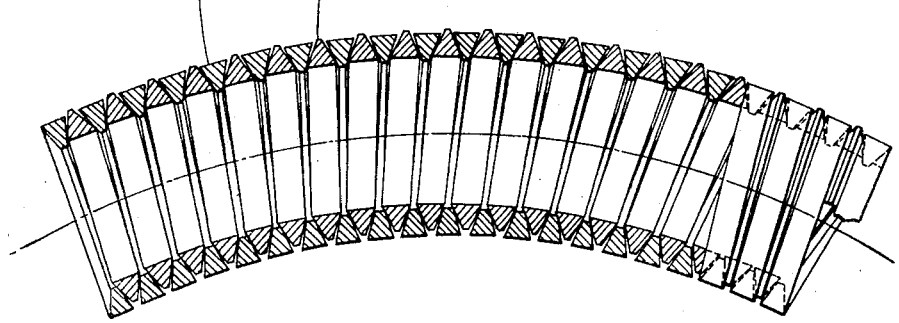
INVENTOR
Rene Tondeur
BY
Nathan, Bowman & Helfrich
ATTORNEYS Patented Sept. 14, 1937

2,092,898

UNITED STATES PATENT OFFICE 2,092,898

FLEXIBLE TUBING

Rene Tondeur, London, England, assignor to Bowden (Engineers) Limited, Willesden Junction, England Application October 25, 1933, Serial No. 695,146
In Great Britain April 7, 1933

8 Claims. (Cl. 64—3)

This invention relates to improvements in mechanism generally known as Bowden mechanism, consisting of an inner part and an outer tubing, by which power is transmitted by the relative longitudinal displacement of the inner part and the outer tubing, such outer tubing being subjected to axial compression forces, during the transmission of such power, and the mechanism being adapted to transmit such power even when the tubing is curved.

As usually constructed the outer member of a Bowden mechanism comprises a flexible tubing or cylindric casing formed of a closely coiled single wire like a helical extension spring, which when curved or folded or looped for the purpose of transmitting motion or power in a direction other than in a straight line, opens on the tension side of the bend in such a way that the reaction is always tending to straighten out such bend and the effective axial length of the flexible tubing is somewhat increased, or in other words when such Bowden mechanism is bent, the flexible tubing forming the outer member lengthens axially with respect to the inner member, and when such Bowden mechanism is straightened out or the bends become less sharp, such outer member shortens axially with respect to the inner member.

In speaking of the axial lengthening and shortening of the outer member, it is to be understood that reference is made to cases in which the diameter of the inner member is not substantially or greatly less than the internal diameter of the outer member.

This axial lengthening and shortening of the outer with respect to the inner member is open to certain disadvantages. Assume, for example, that power is to be transmitted along an S bend where the curves of the flexible tubing are of comparatively long radii when the mechanism is not transmitting power, the tendency when power is being transmitted is for the bend to straighten itself over the longest possible distance between the double curve and for the curves to become sharper with consequent increase in frictional reaction between the inner and outer members and variation in the effective axial length of the tubing.

Also when employing Bowden mechanism as the brake actuating mechanism of motor vehicles for example, the movement of the axle with respect to the chassis results in the power having to be transmitted between two points whose distance apart may vary considerably when the vehicle is travelling over rough surfaces, whereby the effective axial length of the tubing is varied by its changing curvature.

This variability affects the braking action which is also varied in travelling over rough surfaces by vibratory flexures of the curved portions themselves of the Bowden mechanism while the braking pressure is applied.

Further it is frequently desirable to supply predetermined lengths of Bowden mechanism adjusted on the bench for controlling the throttle valves of carburettors on standard motor cycles, but owing to the particular bends which some of such predetermined lengths may be required to take when applied to such motor cycles, the bench adjustment may be so disturbed that in spite of the adjustment provided on the usual fittings of pre-adjusted lengths of Bowden mechanism, it is not unusual to find such pre-adjusted lengths returned for exchange as too short for use, or just usable only by taking the fullest advantage of the adjustment provided.

Moreover if the hand control has been set for slow running of the engine, variations in such curves produced by movements of the steering head, causes the engine either to stop or to accelerate.

The present invention aims in particular to overcome these disadvantages by a construction of flexible tubing of spring steel or other material used for springs which, whilst permitting the tubing to be sufficiently incompressible for the duties for which it is designed, is such that its effective axial length is maintained constant or substantially constant when the tubing is curved and during variations in such curvature and vibratory flexures are considerably dampened by internal frictional resistance of the flexible tubing itself.

To this end the present invention consists in having the outer tubing formed of two or more closely interwound relatively laterally displaceable open coils of such section as when flexed to mutually interact to cause the tubing to expand and contract along the tension and compression sides of the bend respectively, so that the effective axial length of the tubing is maintained substantially constant when the tubing is curved and during variations in such curvature, whilst at the same time the sections of such coils are such as to render the said tubing sufficiently incompressible for the proper transmission of power by the relative displacement of the inner and outer members of such mechanism, the coils being of triangular or trapezoidal section, the angle of inclination in the case of the wire wound base outward not exceeding 45° and in the case of the wire wound base inward not exceeding 60°, or alternatively the coils being respectively of circular section and triangular or trapezoidal section, the angle of the latter coil or coils not exceeding 45°.

The flexible tubing according to the present invention is therefore preferably composed of two closely interwound open-coiled wires (though in some cases more than two may be employed) having such a spacing or pitch and cross-sectional shape of the respective coils that the coils are at all times in normal use in continuous spiral contacting relationship and are so formed as to render the interwound coil tubing self-sustaining against relative bodily lateral displacement of the coils under axial compression. Whilst the adjacent turns of the same coil are not in contact when the tubing is straight so that when the tubing is flexed, relative transverse movements of the curved portions are set up between the two coils to cause them to move into and out of concentric relationship without substantially varying the effective axial length of the tubing as a whole, the closing together in such a tubing of the coils on the inside curve and the separation of the coils on the outside curve being permitted by a radial displacement with respect to the centre of curvature of one coil with respect to the other. Such displacement is produced by double inclined plane or cam action of one coil on the other on the inside curve which develops a shortening arc of continuous contact and a mutually controlled action of the coils on the outside curve to develop a lengthening arc of continuous contact, which actions can be so predetermined when desired as to cause the effective axial length of the tubing as a whole to be maintained substantially constant when the tubing is curved and during variations in such curvature. The tendency of the flexed tubing to straighten when power is applied is also eliminated or greatly reduced and the frictional reaction between the two coils which (caeteris paribus) is greater the smaller the angle of the wedge action, also tends to damp vibrations.

In order that the present invention may be the more readily understood, reference is hereinafter made to the constructional forms of flexible tubing under the present invention illustrated by way of example in the accompanying drawings, in which:—

Figs. 3 and 4 are similar views of a modified form of tubing.

Fig. 5 is a sectional view of a further modified form of tubing.

Figure 1:
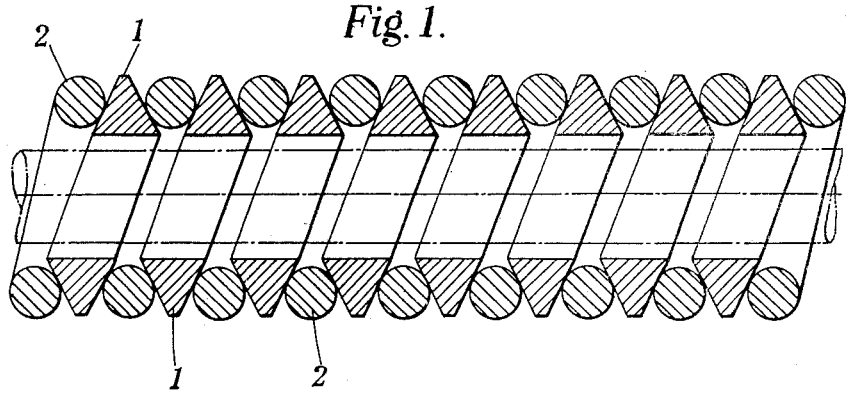
Fig. 1 is a sectional view of a length of tubing and Fig. 2 a sectional view showing such length curved.
Figure 2:
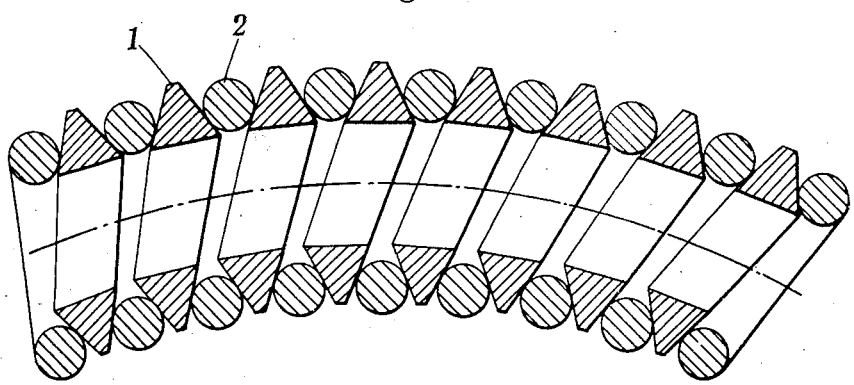

As shown in the accompanying drawings, incompressible flexible tubing which is found to work well for the purposes of the present invention is formed of two closely interwound open-coils 1, 2 of spring steel or like material which in Figs. 1 and 2 are of wedge and round section respectively and in Figs. 3 and 4 are both of wedge section with the wider portion of the wedge on the inside as shown in Fig. 1, although if desired it may be on the outside, and with the wider portions of the respective coils alternately on the inside and the outside in Fig. 3.

The flexing of the tubing results in a wider part of the wedge section coming into contact with the adjacent sections of the other coil on the outer or tension side of the bend so that the arc of continuous contact is lengthened, whilst at the inner or compression side of the bend a narrower part of the wedge section of one coil comes between adjacent sections of the other coil and develops a shorter arc of continuous contact. In the case of the wedge and reverse wedge arrangement of coils shown in Figs. 3 and 4, a wider part of the wedge sections with apex inwards comes into contact with the base of the reverse wedges on the outer bend and on the inner bend there is a relative recession of the apex of the wedges directed inwards from the base of the wedges with apex outwards.

In forming the flexible tubing the apex angle α between the converging sides of the wedge section wire becomes larger when the wire is wound base inwards and becomes smaller when winding the wire base outwards, the amount of the increase or decrease in the angle α depending on the tension given to the wire while winding, as well as on the section and material of the coils.

For this reason the wedge section wire to be wound base inwards is so chosen that the angle α is smaller than that required in the finished product, and the wedge section wire required to be wound base outwards is so chosen that the angle α is larger than that required in the finished product.

By way of example we set out below a table giving the inside and outside diameters and starting and finishing angles of the wedge section wires of forms of flexible tubing made under the present invention which have been found to give good results, the wire in all cases being steel wire of 100 tons tensile strength.

| | Outside diameter | Inside diameter | Starting and finishing angle α of wedge section wires— | |
|---|---|---|---|---|
| | | | Wire wound base outwards | Wire wound base inwards |
| | Inches | Inches | Degrees | Degrees |
| 1 | .150 | .078 | 38–34 | 38–40 |
| 2 | .260 | .130 | 39–32 | 39–48 |
| 3 | .383 | .190 | 39–29 | 39–51 |
| 4 | .510 | .254 | 45–37 | 42–53 |
| 5 | .580 | .320 | 45–38.5 | 42–53 |
| 6 | .860 | .610 | 45–41 | 45–54.5 |

In the examples above indicated, the dimensions of the section of the wire are as follows, A representing the base of the wedge, B, the height, and C the truncated top of the wedge.

Size of wire ordered

| | A | B | C |
|---|---|---|---|
| | Inches | Inches | Inches |
| 1 | .044 | .034 | .020. |
| 2 | .062 | .062 | .017. |
| 3 | .092 | .092 | .025. |
| 4 | .125 | .125 | .022 (wire wound base outwards). |
| | .125 | .125 | .04 (wire wound base inwards). |
| 5 | .125 | .125 | .022 (wire wound base outwards). |
| | .125 | .125 | .04 (wire wound base inwards). |
| 6 | .125 | .125 | .022. |

The form of flexible tubing at present preferred is that in which both coils are of blunt wedge (trapezoidal) section as this gives a smoother finish to the inner and outer surfaces to the tubing.

In the case of Bowden mechanism the outer tube has to withstand intense axial pressure and must be nearly incompressible thereunder. The tubing to be used for such purpose must therefore satisfy two requirements, firstly the two coils must be substantially relatively immoveable under axial pressure and secondly they must be relatively laterally displaceable with comparative freedom when the tubing is curved.

In order to fulfill the first condition with a minimum quantity of material the angle between the converging sides of the triangular or trapezoidal section must not be too large, as caeteris paribus, the compressibility becomes greater as this angle is increased, and in order to obtain the requisite degree of incompressibility with wider angles an undue amount of material must be employed.

According to the present invention I therefore, when there are two trapezoidal or triangular wires arrange that the angle in the case of the wire wound with the base outward should not exceed 45° and in the case of the wire wound with the base inwards should not exceed 60° and I am of the opinion that the best results are obtained when both angles are of less than 45°. The angles above given refer to the finishing angles between the two converging sides. An angle 45° or less is also used for the trapezoidal wire in the case of tubing composed of wires of trapezoidal and round sections as shown in Figs. 1 and 2. I also prefer to make two coils of approximately equal elastic strength as otherwise the resistance to compression tends to depend on the weaker of the two and the extra strength of the other is largely wasted.

Of course the angles must be such that the tangent of the semi-angle of the wedge is sufficiently greater than the coefficient of friction to permit easy lateral displacement. Where a coil of circular wire is used I prefer to wind the triangular or trapezoidal section with the apex outwards as the circular wire is better adapted to resist tensional than compressive stress, and with this arrangement the tensional stress produced by axial compressive forces is borne by the coil of circular section.

The frictional reaction of the interwound coils during relative lateral displacement thereof and the dampening effect obtained thereby is considerably increased when the flexible tubing is under compression.

Flexible tubing according to the present invention has the further advantage that for greater strength and stiffness, two or more flexible tubings may be employed grouped or nested one inside the other as shown by Fig. 5 and the components 3, 4, 5, and 6 in such a compound tubing share the load between them, whereas if the usually constructed outer members comprising flexible tubing formed of closely coiled single wire like a helical extension spring are similarly grouped or nested the outer tubing alone takes the substantial load. In Fig. 5 the inner member is indicated by the reference 7.

While in general that construction of flexible tubing according to the present invention is preferred which is composed of two closely interwound relatively laterally displaceable open coils, the number of coils used and their pitch angle will depend on the diameter and gauge of the coils which will be chosen to suit the duties which the tubing is desired to perform.

In general the fewer the closely interwound coils of tubing of a given diameter and gauge and consequently the smaller the pitch angle, the greater is the compression load that the tubing can withstand.

It will be obvious that whether the tubing is composed wholly of closely interwound coils of trapezoidal section or comprises a coil or coils of circular section, the tubing cannot be constructed of an odd number of such coils.

A further advantage of flexible tubing according to the present invention is that the use of waterproof sheathing to preserve it from the ingress of moisture and the consequent oxidation effects of moisture in the presence of feebly circulating air is no longer essential owing to the continuous spiral contact which can be maintained at all times between the coils.

What I claim is:—

1. In Bowden mechanism an outer tubing composed of a plurality of closely interwound relatively laterally displaceable coils adapted to resist intense axial compressive forces, said coils being substantially completely interpenetrating affording substantially smooth outer and inner surfaces of the tubing, the cross-sections of said coils being so formed that on the flexing of the outer tubing the coils mutually interact to cause said tubing to expand along the tension side of the bend and to contract along the compression side of the bend so that the effective axial length of said tubing is maintained substantially constant, at least alternate sections being of radially diminishing order having substantially straight converging sides, the finishing angle made by the working zones of the sides of each section being such that the tangent of its semi-angle is greater than the co-efficient of friction between the coils but does not exceed 45° when the tubing is in a straight or curved position.

2. In Bowden mechanism an outer tubing composed of a plurality of closely interwound relatively laterally displaceable coils, said coils being substantially completely interpenetrating so that the thickness of the wall of the tubing is substantially that of one of the coils, the cross sections of said coils being so formed that on the flexing of the outer tubing the coils mutually interact to cause said tubing to expand along the tension side of the bend and to contract along the compression side of the bend so that the effective axial length of said tubing is maintained substantially constant, at least alternate sections being of trapezoidal shape the finishing angle made by the working zones of the converging sides of each section not exceeding 45° either when the tubing is straight or when it is curved and being such that the tangent of its semi-angle is greater than the coefficient of friction between the coils.

3. In Bowden mechanism an outer tubing composed of at least two closely interwound relatively laterally displaceable coils, adapted on the flexing of the outer tubing mutually to interact to cause said tubing to expand along the tension side of the bend and to contract along the compression side of the bend so that the effective axial length of said tubing is maintained substantially constant, said coils being respectively of circular cross section and of radially diminishing cross section, said latter sections alternating with said circular cross sections, the finishing vertical angle of the radially diminishing sections not exceeding 45° but being such that the tangent of its semi-angle is greater than the co-efficient of friction between the coils.

4. In Bowden mechanism an outer tubing composed of at least two closely interwound relatively laterally displaceable coils, adapted on the flexing of the outer tubing mutually to interact to cause said tubing to expand along the tension side of the bend and to contract along the compression side of the bend so that the effective axial length of said tubing is maintained substantially constant, said coils being respectively of circular cross-section and of radially diminishing cross section wound base inwards, said latter sections alternating with said circular cross sections, the finishing vertical angle of the radially diminishing sections not exceeding 45° but being such that the tangent of its semi-angle is greater than the co-efficient of friction between the coils.

5. In Bowden mechanism an outer tubing composed of at least two closely interwound relatively laterally displaceable coils adapted on the flexing of the outer tubing mutually to interact to cause said tubing to expand along the tension side of the bend and to contract along the compression side of the bend so that the effective axial length of said tubing is maintained substantially constant, said coils being respectively of circular cross section and of trapezoidal cross section, said latter sections alternating with said circular cross sections, the finishing vertical angle of the trapezoidal sections not exceeding 45°.

6. In Bowden mechanism an outer sheathing consisting of a plurality of tubings nested one inside the other, each of said tubings being composed of a plurality of closely interwound relatively laterally displaceable coils, the cross-sections of said coils being so formed that on the flexing of the outer sheathing the coils mutually interact to cause said sheathing to expand along the tension side of the bend and to contract along the compression side of the bend so that the effective axial length of said sheathing is maintained substantially constant, at least alternate sections being of radially diminishing order having substantially straight converging sides, the finishing angle made by said sides being such that the tangent of its semi-angle is greater than the co-efficient of friction between the coils but does not exceed 45° either when the tubing is straight or when it is curved so that the tubing is rendered substantially incompressible under load and none the less readily flexible.

7. In Bowden mechanism an outer tubing composed of at least two relatively laterally displaceable coils wound closely into substantially complete interpenetration, said coils being respectively of circular cross section and of trapezoidal cross section wound base inwards, said latter sections alternating with said circular cross sections, said trapezoidal section coil being wound of wire whose vertical angle does not exceed 45°.

8. In Bowden mechanism, an outer tubing composed of a plurality of closely interwound relatively laterally displaceable coils, the wires forming said coils being of radially diminishing cross section, the wires being wound with alternate sections base inwards and the other sections base outwards so that on the flexing of the outer tubing the coils mutually interact to cause said tubing to expand along the tension side of the bend and to contract along the compression side of the bend so that the effective axial length of said tubing is maintained substantially constant, the finishing angle made by the working zones of the converging sides of each section not exceeding 45° either when the tubing is straight or when it is curved and being such that the tangent of its semi-angle is greater than the co-efficient of friction between the coils.

RENE TONDEUR.